(12) United States Patent
Sivaram et al.

(10) Patent No.: US 7,212,941 B2
(45) Date of Patent: May 1, 2007

(54) NON-DETERMINISTIC PROTOCOL PACKET TESTING

(75) Inventors: Angarai T. Sivaram, Saratoga, CA (US); Burnell G. West, Half Moon Bay, CA (US); Howard Maassen, San Jose, CA (US)

(73) Assignee: Credence Systems Corporation, Milpitas, CA (US)

( * ) Notice: Subject to any disclaimer, the term of this patent is extended or adjusted under 35 U.S.C. 154(b) by 128 days.

(21) Appl. No.: 10/924,675

(22) Filed: Aug. 24, 2004

(65) Prior Publication Data

US 2006/0047461 A1   Mar. 2, 2006

(51) Int. Cl.
*G01R 31/00* (2006.01)
(52) U.S. Cl. .................. 702/120; 714/37; 714/735
(58) Field of Classification Search ............ 702/120; 714/735, 37
See application file for complete search history.

(56) References Cited

U.S. PATENT DOCUMENTS

| 5,495,481 | A  | * | 2/1996 | Duckwall | 370/462 |
| 6,510,398 | B1 | * | 1/2003 | Kundu et al. | 702/117 |
| 6,707,313 | B1 | * | 3/2004 | Rohrbaugh et al. | 324/765 |
| 2002/0049942 | A1 | * | 4/2002 | Kawai | 714/724 |
| 2003/0105607 | A1 |   | 6/2003 | Jones | |
| 2004/0267487 | A1 | * | 12/2004 | Brown et al. | 702/120 |

* cited by examiner

*Primary Examiner*—Marc S. Hoff
*Assistant Examiner*—Janet L Suglo

(57) ABSTRACT

A test apparatus implements a method for testing electronic devices that exhibit non-deterministic behavior. The test apparatus includes a high-speed buffer queue for storing data packets. The data packets arrive at one end of the queue and, as they exit at the other end, are compared against expect data packets stored in memory. If the data packet exiting the buffer queue corresponds to response signals generated by the device under test during a non-deterministic (e.g., idle) state, the expect data packet is not retrieved from memory and the comparison is not made.

20 Claims, 5 Drawing Sheets

NON-DETERMINISTIC PROTOCOL PACKET TESTING

BACKGROUND OF THE INVENTION

1. Field of the Invention

The present invention relates generally to electronic device testing, and more particularly, to testing of integrated circuit (IC) devices exhibiting non-deterministic behavior.

2. Description of the Related Art

Next generation microprocessors will use a large number of high-speed serial links to communicate with external memory and I/O devices. High-speed serial links in general exhibit a non-deterministic behavior during data transmission. The conventional automated test equipment (ATE) available in the marketplace does not have a test methodology to deal with this non-determinism, and is not able to perform validation and production testing of these devices.

As illustrated in the table below, the conventional ATE uses stored stimulus patterns (D1, D2, D3, etc.) to drive the device under test at set time intervals (t1, t2, t3, etc.). The conventional ATE then compares the response signals from the device under test with stored response patterns (E1, E2, E3, etc.) at each of the set time intervals (t1, t2, t3, etc.). A fail trigger is issued if there is a mismatch between the actual response signal and the stored response pattern.

| Time | Drive | Expect | Actual |
| --- | --- | --- | --- |
| t1 | D1 | E1 | E1 |
| t2 | D2 | E2 | E2 |
| t3 | D3 | E3 | E3 |
| t4 | D4 | E4 | E4 |
| t5 | D5 | E5 | E5 |
| t6 | D6 | E6 | E6 |
| t7 | D7 | E7 | E7 |
| t8 | D8 | E8 | E8 |
| t9 | D9 | E9 | E9 |

This test methodology works as long as the device under test exhibits deterministic behavior, i.e., a one-to-one correspondence between the drive signal and the response signal is expected. Some ICs, however, exhibit non-deterministic behavior (e.g., in response to certain inputs, the device under test idles prior to exhibiting a response), and the test methodology used in conjunction with the conventional ATE is not able to perform validation and production testing of these devices. The table below shows a sample response of an IC that exhibits non-deterministic behavior. If the conventional test methodology is used in testing this IC, all comparisons after t1 will result in a fail trigger.

| Time | Drive | Expect | Actual |
| --- | --- | --- | --- |
| t1 | D1 | E1 | E1 |
| t2 | D2 | E2 | idle |
| t3 | D3 | E3 | E2 |
| t4 | D4 | E4 | idle |
| t5 | D5 | E5 | idle |
| t6 | D6 | E6 | E3 |
| t7 | D7 | E7 | E4 |
| t8 | D8 | E8 | idle |
| t9 | D9 | E9 | E5 |

SUMMARY OF THE INVENTION

The invention provides a test methodology for testing electronic devices that exhibit non-deterministic behavior, and an apparatus in which such test methodology is implemented.

The invention includes a high-speed buffer queue for storing data packets. The data packets arrive at one end of the queue and, as they exit at the other end, are compared against expect data packets stored in memory. If the data packet exiting the buffer queue corresponds to response signals generated by the device under test during a non-deterministic (e.g., idle) state, the expect data packet is not retrieved from memory and the comparison is not made.

The determination of whether the device under test is in a non-deterministic state is made by looking for a non-deterministic code in data packets corresponding to one or more output pins of the device under test. In a typical application, the designer of the device under test designates one or two output pins of the device under test as the pin or pins at which a non-deterministic code will appear when the device under test is in a non-deterministic state. In such a case, only those data packets corresponding to such pin or pins will be examined for a non-deterministic code.

In the preferred embodiment, a counter and a high-speed buffer queue are provided for each stream of data packets. The counter is initialized at the beginning of the test and incremented each time a data packet in the stream enters the high-speed buffer queue. If a non-deterministic code is found in a data packet, the counter reading corresponding to that data packet is recorded, and the other data packets with the same counter reading will not be compared with expect data packets when they exit their corresponding buffer queues at a later time.

When a single instrument is used in the testing, the counter reading associated with the non-deterministic data packet is included in a message block that is communicated internally between a pair of field programmable field arrays. When multiple instruments are used in the testing, the counter reading associated with the non-deterministic data packet is included in a message block that is communicated over the system bus to other instruments.

The length of the buffer queue is designed so that the maximum time it takes for all instruments to have received the message block is less than the time it takes for a data packet to travel from one end of the buffer queue to the other. This way, by the time a data packet exits the buffer queue, the instrument will know whether the exiting data packet corresponds to a non-deterministic data packet or not.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
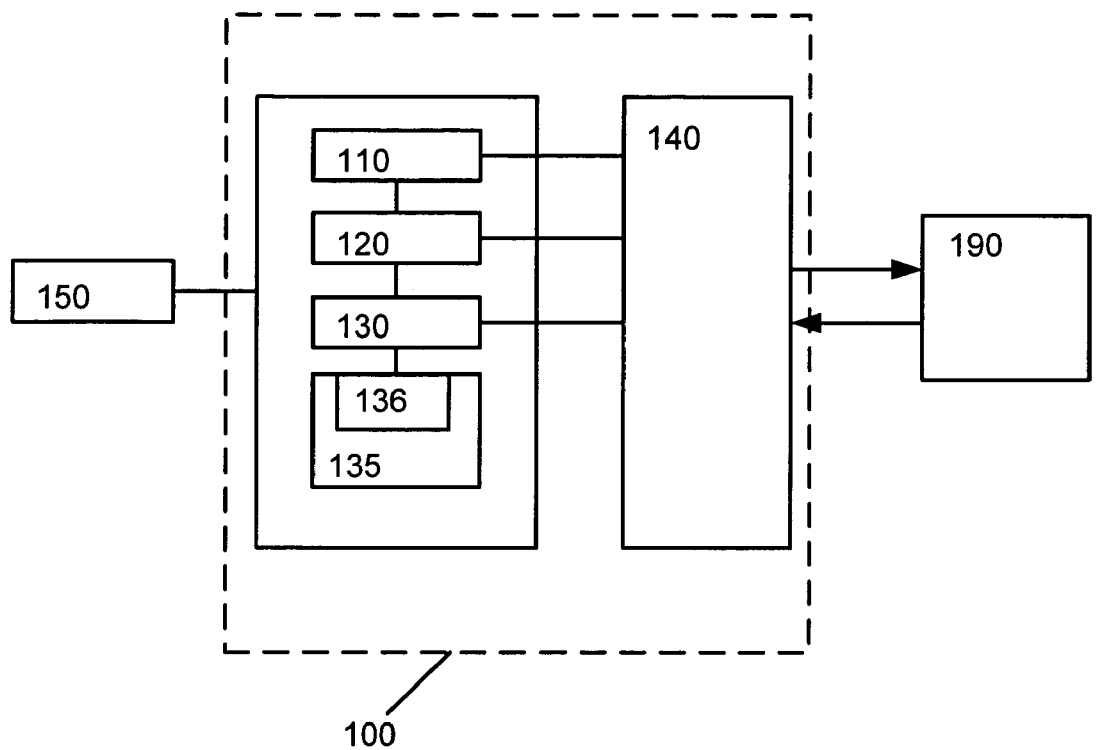
FIG. 1 is a block diagram of a tester according to an embodiment of the invention and a device under test.

FIG. 1 is a block diagram of a tester 100 that is used in testing electronic devices. The tester 100 includes a number of slots in which a number of instruments are inserted. The instruments include a device power supply (DPS) 110 for supplying power to a device under test (DUT) 190, analog test instruments 120 for supplying test signals to input analog pins of the DUT 190 and receiving response signals from output analog pins of the DUT 190, digital test instruments 130 for supplying test signals to input digital pins of the DUT 190 and receiving response signals from output digital pins of the DUT 190, a test head interface 135 which houses a master clock 136, and a fixture 140, known in the art as a loadboard, for providing a connection interface between the instruments 110, 120, 130 and the DUT 190. During testing, the tester 100 operates under the control of software, e.g., a test program 150. The bus architecture of the tester 100 by which the instruments 110, 120, 130, 135 communicate with each other, and other details of the tester 100, are described in U.S. patent application Ser. No. 10/222,191, entitled "Circuit Testing with Ring-Connected Test Instrument Modules," filed Aug. 16, 2002, which is incorporated by reference herein.

Figure 2:
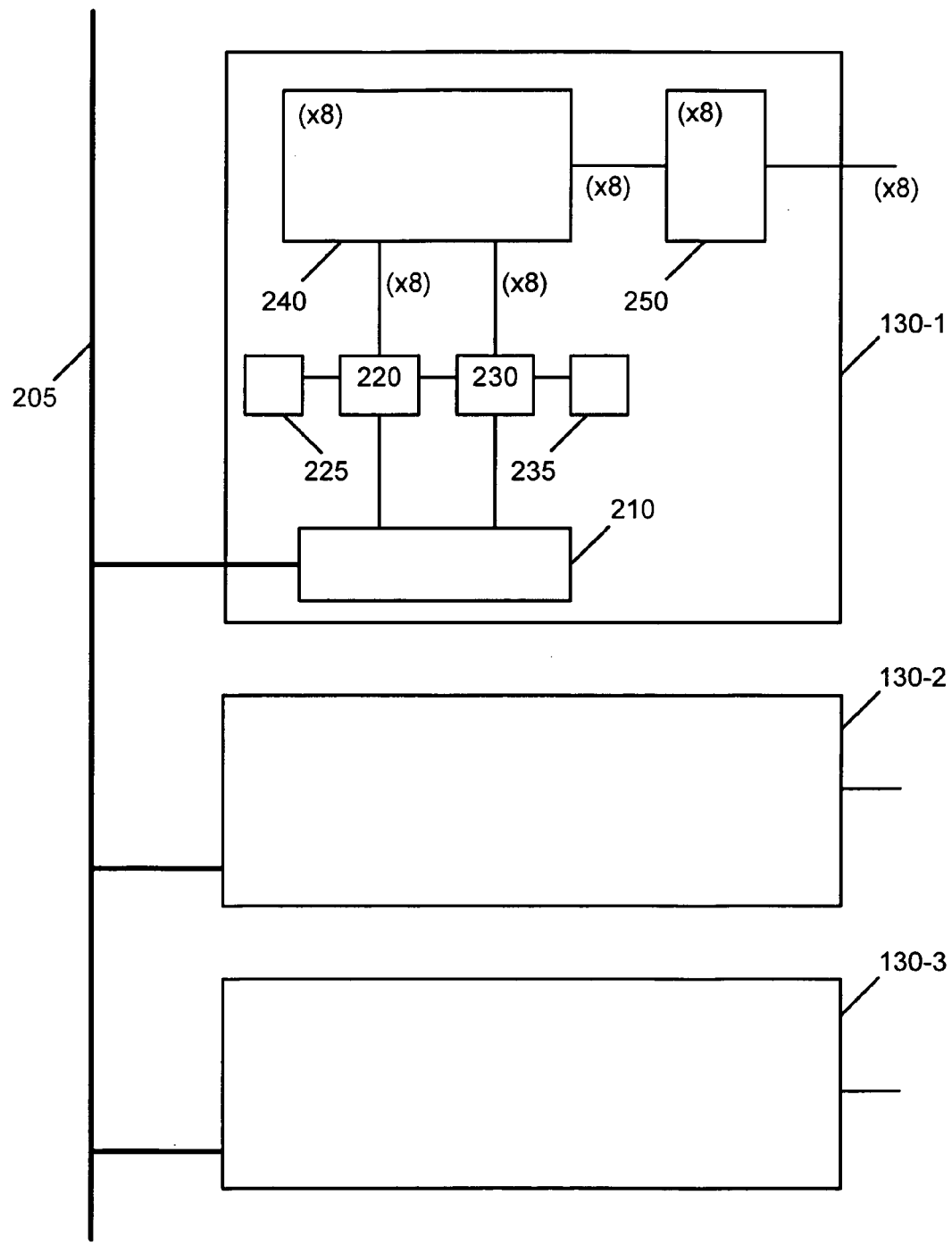
FIG. 2 is a block diagram showing an instrument used in the tester of FIG. 1 in more detail.

FIG. 2 is a block diagram of digital test instruments 130-1, 130-2, 130-3 that communicate with each other over a system bus 205. Each of the digital instruments 130 comprises substantially the same circuitry. For simplicity, the circuitry of only the digital instrument 130-1 is illustrated in FIG. 2.

In the preferred embodiment, the digital instrument 130-1 includes a bus interface field programmable gate array (FPGA) 210, a pair of FPGAs 220, 230 and their associated dual inline memory modules (DIMMs) 225, 235, eight timing generation circuits 240 (only one of which is illustrated), and eight pin electronics circuits 250 (only one of which is illustrated). Each of the timing generation circuits 240 is connected to a different one of the pin electronics circuits 250, and each of the eight pin electronic circuits 250 is connected to a different digital pin of the DUT 190 through the fixture 140. There are two sets of eight data lines between the timing generation circuits 240 and the FPGAs 220, 230. The first set connects each of the eight timing generation circuits 240 to the FPGA 220 and the second set connects each of the eight timing generation circuits 240 to the FPGA 230. The FPGAs 220, 230 are also connected to their respective DIMMs 225, 235, and to the bus interface FPGA 210, which interfaces with the system bus 205.

The components of the digital instrument 130-1, shown in FIG. 2, function together, and with other components of the digital instrument 130-1 that are not illustrated, e.g., a power module, a parametric measurement unit (PMU) and a timing measurement unit (TMU), to generate test signals for the input digital pins of the DUT 190 and to receive and process response signals from the output digital pins of the DUT 190.

The digital instrument 130-1 digitizes response signals from the output digital pins of the DUT 190 into a data stream of 16-bit chunks (each 16-bit chunk is referred to as a word) and compared against an expect data packet that is retrieved from the DIMM 235. The digital instrument 130-1 performs this test continuously, and issues a fail trigger each time there is a mismatch.

Before any comparison is made, however, it is necessary to align the data stream of words to the expect data packets. This process is known in the art as frame synchronization or frame alignment. This process needs to be separately performed because the digital instrument 130-1 begins generating the data stream of words from the response signals (a continuous stream of 0's and 1's) without regard to when the response signals that are to be converted and compared with the expect data packets begin arriving from the output digital pins of the DUT 190.

Figure 3:
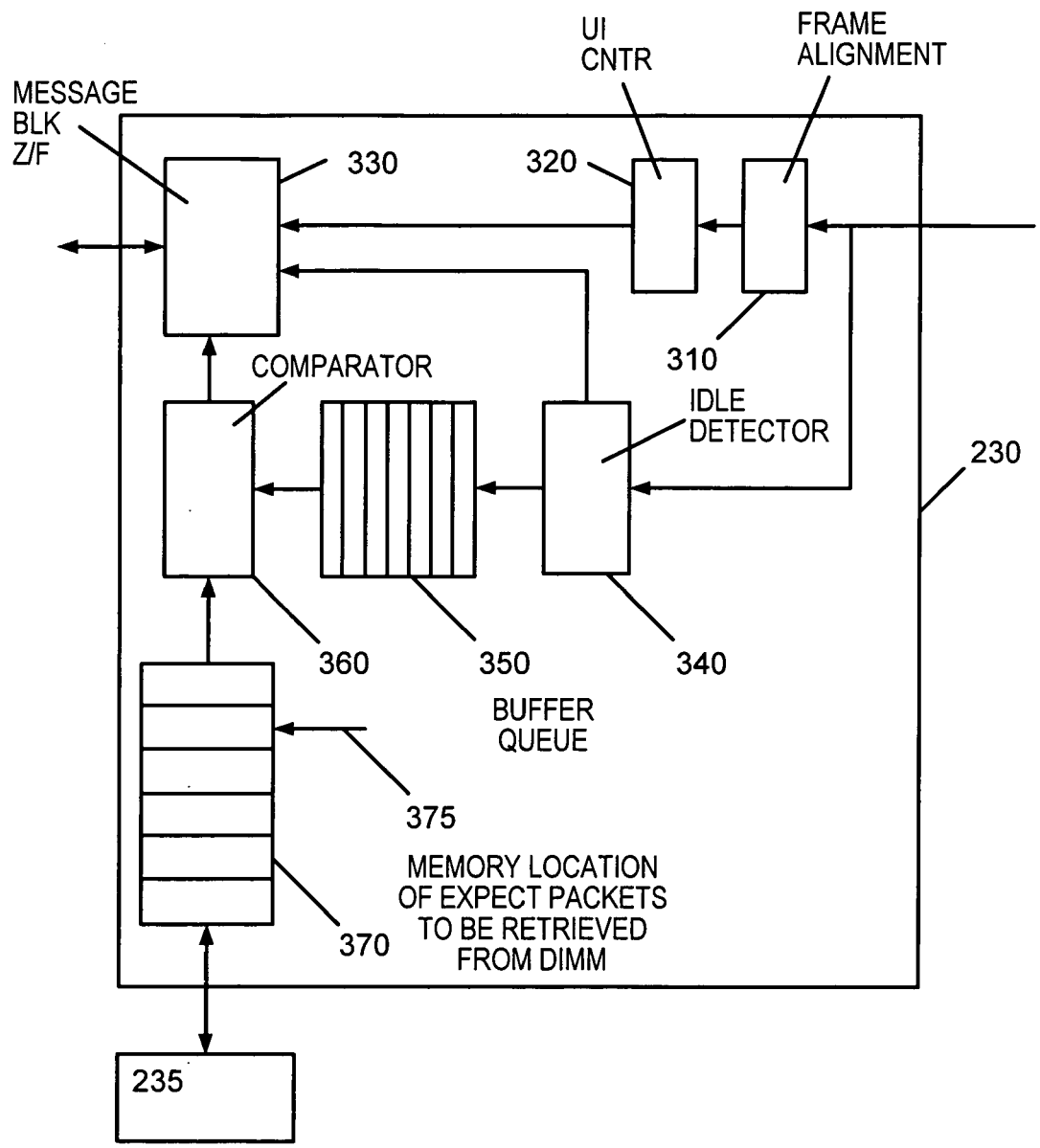
FIG. 3 is a block diagram showing a component of the instrument depicted in FIG. 2 in more detail.

FIG. 3 is a block diagram illustrating the components of the FPGA 230 that processes a data stream from one of the eight timing generation circuits 240. The FPGA 230 includes seven additional copies of the circuit shown in FIG. 3 to process the data streams from the remaining seven timing generation circuits 240.

The FPGA 230 includes a frame synchronization module 310 for performing frame synchronization or frame alignment, a unit interval (UI) counter 320 that is incremented each time a word is received by the FPGA 230, a message block interface 330 for communicating with the FPGA 220, an idle detector 340 for detecting an idle code in the data stream of words received from the timing generation circuit 240, a high-speed buffer queue 350 for delaying the data stream of words prior to comparing them with an expect data packet, a comparator 360 for performing the comparison, and an address memory 370 that stores in a sequential manner the memory locations of expect data packets to be retrieved from the DIMM 235. The sequence of expect data packets to be retrieved from the DIMM 235 is specified by the test program.

Figure 4:
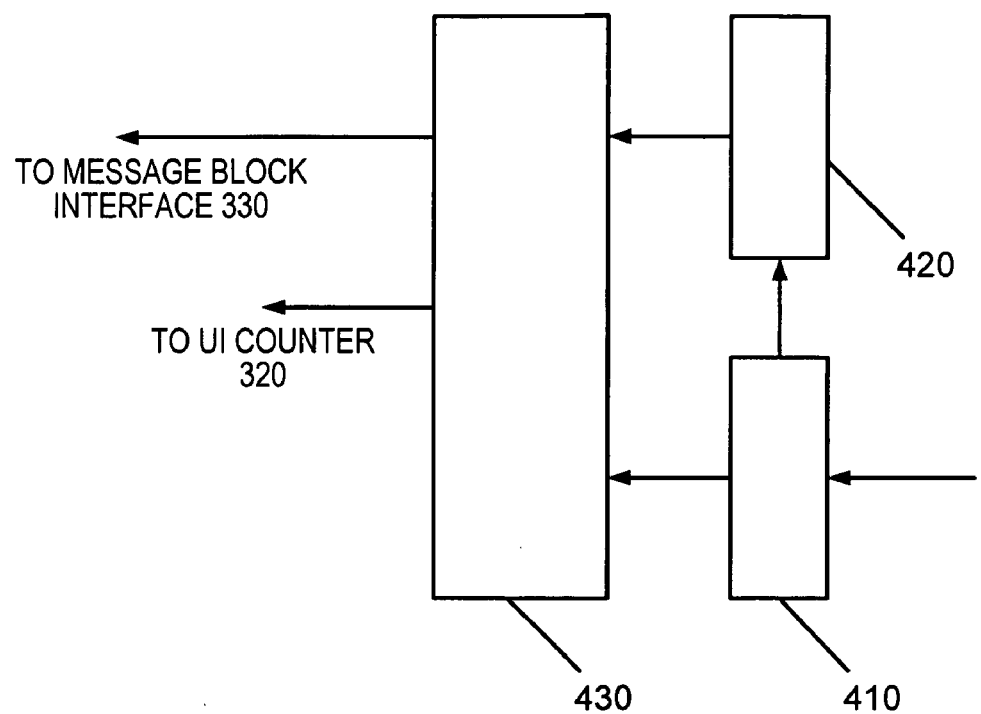
FIG. 4 is a block diagram of a frame synchronization module implemented in the component of FIG. 3.

The frame synchronization module 310 is illustrated in further detail in FIG. 4. It includes word buffers 410, 420 and a 32-bit comparator 430. The comparator 430 looks for a frame synchronization code (e.g., a 5-bit code '01110') in the 32-bit data formed by combining the words stored in the buffers 410, 420. By using a 32-bit comparator in this manner, the frame synchronization code can be found in the boundary between any two successive words. The table below shows the 32-bit data that is being compared with the 16-bit data received at the buffer 410 at successive points in time: t0, t1, t2, t3, . . . , t(n).

| Time | 16-bit data (C data) | 32-bit data |
|------|---------------------|-------------|
| t0   | W0                  | W0 + null   |
| t1   | W1                  | W1 + W0     |
| t2   | W2                  | W2 + W1     |
| t3   | W3                  | W3 + W2     |
| *    | *                   | *           |
| *    | *                   | *           |
| *    | *                   | *           |
| t(n) | W(n)                | W(n) + W(n − 1) |

When the frame synchronization code is found, the UI counter 320 is initialized, and a frame synchronization detect message including a bit position corresponding to the start of a frame is sent to the message block interface 330. Frame synchronization is performed pin by pin. Therefore, each copy of the circuit shown in FIG. 3 has its own frame synchronized bit position stored in the message block interface 330.

After frame synchronization, the frame synchronization module 310 is not used, and the UI counter 320 is incremented each time a new word (corresponding to a set of 16-bits measured from the frame synchronized bit position) arrives from the corresponding timing generation circuit 240. Also, each time the UI counter 320 is incremented, the counter reading is communicated to the message block interface 330. The new word is also supplied to the idle detector 340 and stored in the high-speed buffer queue 350. The high-speed buffer queue 350 is configured as a first-in, first out (FIFO) buffer so that each time a new word arrives from the corresponding timing generation circuit 240, all of the words already in the buffer queue 350 advance one position away from the start position of the buffer towards the end position of the buffer, and the new word is stored in the start position of the buffer. When the arrival of the next new word causes the word stored at the end of the buffer to exit: (i) a pointer 375 associated with the address memory 370 is advanced once; (ii) an expect data packet is retrieved from the DIMM 235 at the memory location indicated by the pointer 375; and (iii) the comparator 360 performs a comparison of the exiting word against the retrieved data packet. If there is a mismatch, a fail trigger is issued to the message block interface 330.

A typical DUT may have one or two of its output digital pins designated as the pin(s) at which idle codes appear. If one pin is designated (e.g., Pin 0), the idle detector 340 associated with the stream of data packets corresponding to this pin is activated and looks for an idle code (e.g., '1111') in each new word that it is supplied (e.g., in the 4 most significant bit positions). All other idle detectors are turned off. For example, an idle state will be determined in the following situation:

| Pin 0 | 1 | 1 | 1 | 1 | 0 | 0 | 0 | 0 | 0 | 0 | 0 | 0 | 0 | 0 | 0 | 0 |
|---|---|---|---|---|---|---|---|---|---|---|---|---|---|---|---|---|
| bit position | 15 | 14 | 13 | 12 | 11 | 10 | 9 | 8 | 7 | 6 | 5 | 4 | 3 | 2 | 1 | 0 | but not in the following situation:

| Pin 0 | 1 | 1 | 1 | 0 | 0 | 1 | 1 | 1 | 1 | 0 | 0 | 0 | 0 | 0 | 0 | 0 |
|---|---|---|---|---|---|---|---|---|---|---|---|---|---|---|---|---|
| bit position | 15 | 14 | 13 | 12 | 11 | 10 | 9 | 8 | 7 | 6 | 5 | 4 | 3 | 2 | 1 | 0 |

If two pins are designated (e.g., Pin 0 and Pin 1), the two idle detectors 340 associated with the streams of data packets corresponding to the two pins are activated, and each of the two idle detectors 340 look for an idle code (e.g., '11') in each new word that it is supplied (e.g., in the 2 most significant bit positions). All other idle detectors are turned off. If both idle detectors 340 find the idle code at the same time (or at the same counter reading), it is determined that the DUT 190 is under an idle state at that time. For example, an idle state will be determined in the following situation:

| Pin 0 | 1 | 1 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| Pin 1 | 1 | 1 | 0 | 0 | 0 | 0 | 0 | 0 | 0 | 0 | 0 | 0 | 0 | 0 | 0 | 0 |
| bit position | 15 | 14 | 13 | 12 | 11 | 10 | 9 | 8 | 7 | 6 | 5 | 4 | 3 | 2 | 1 | 0 | but not in the following situation:

| Pin 0 | 0 | 1 | 0 | 0 | 1 | 1 | 0 | 0 | 0 | 0 | 0 | 0 | 0 | 0 | 0 | 0 |
|---|---|---|---|---|---|---|---|---|---|---|---|---|---|---|---|---|
| Pin 1 | 1 | 1 | 1 | 1 | 1 | 1 | 0 | 0 | 0 | 0 | 0 | 0 | 0 | 0 | 0 | 0 |
| bit position | 15 | 14 | 13 | 12 | 11 | 10 | 9 | 8 | 7 | 6 | 5 | 4 | 3 | 2 | 1 | 0 |

When the idle state is determined, the UI counter reading associated with the word(s) in which the idle code was detected is stored in the message block interface 330. All words having the same UI counter reading are determined to be idle data packets and are not compared with expect data packets.

For example, assume there are two digital instruments, each connected to four output digital pins of the DUT 190. The streams of frame synchronized data packets generated from the response signals from these pins will be referred to as first through eighth streams. The first digital instrument processes the first through fourth streams, and the second digital instrument processes the fifth through eighth streams.

In the example, the first and second streams are examined for idle codes. When the idle code is detected in data packets in the first and second streams by the idle detectors 340, the counter reading of the UI counters 320 is stored at the message block interfaces 330 associated with the first and second streams and communicated to the message block interfaces 330 associated with the third and fourth streams internally through the FPGA 220, and communicated to the message block interfaces 330 associated with the fifth through eighth streams through the FPGA 220 of the first digital instrument, the bus interface FPGA 210 of the first digital instrument, the system bus 205, the bus interface FPGA 210 of the second digital instrument, and the FPGA 220 of the second digital instrument.

As the data packets in the third through eighth streams exit their corresponding high-speed buffer queues 350, the FPGA 230 examines the corresponding message block interface 330 to determine if the comparison of the exiting data packet should be suppressed. If the comparison is to be suppressed: (i) the expect data pointer 375 is not advanced; (ii) the expect data packet is not retrieved; and (iii) the comparator 360 does not compare the exiting data packet against any expect data packet. If the comparison is to be made: (i) the expect data pointer 375 is advanced once; (ii) the expect data packet is retrieved from the memory location of the DIMM 235 indicated by the expect data pointer 375; and (iii) the comparator 360 compares the exiting data packet against the retrieved expect data packet.

The determination of whether the comparison of the exiting data packet should be suppressed or performed is made with respect to the UI counter reading associated with the detection of an idle code, the size of the high-speed buffer queue 350, and the current UI counter reading. If the current UI counter reading is equal to the idle code UI counter reading+buffer size/16 bits, the comparison is to be suppressed. If not, the comparison is to be performed. In the preferred embodiment, the buffer size is 1024 bits. Therefore, an idle code that is detected at a particular point in time will affect the determination of whether the comparison of the exiting data packet should be suppressed or performed 64 counter increments after the particular point in time. If a new 16-bit word is processed every 5 nanoseconds, this means that the high-speed buffer queue 350 delays the comparison by 320 nanoseconds.

Figures 5A, 5B:
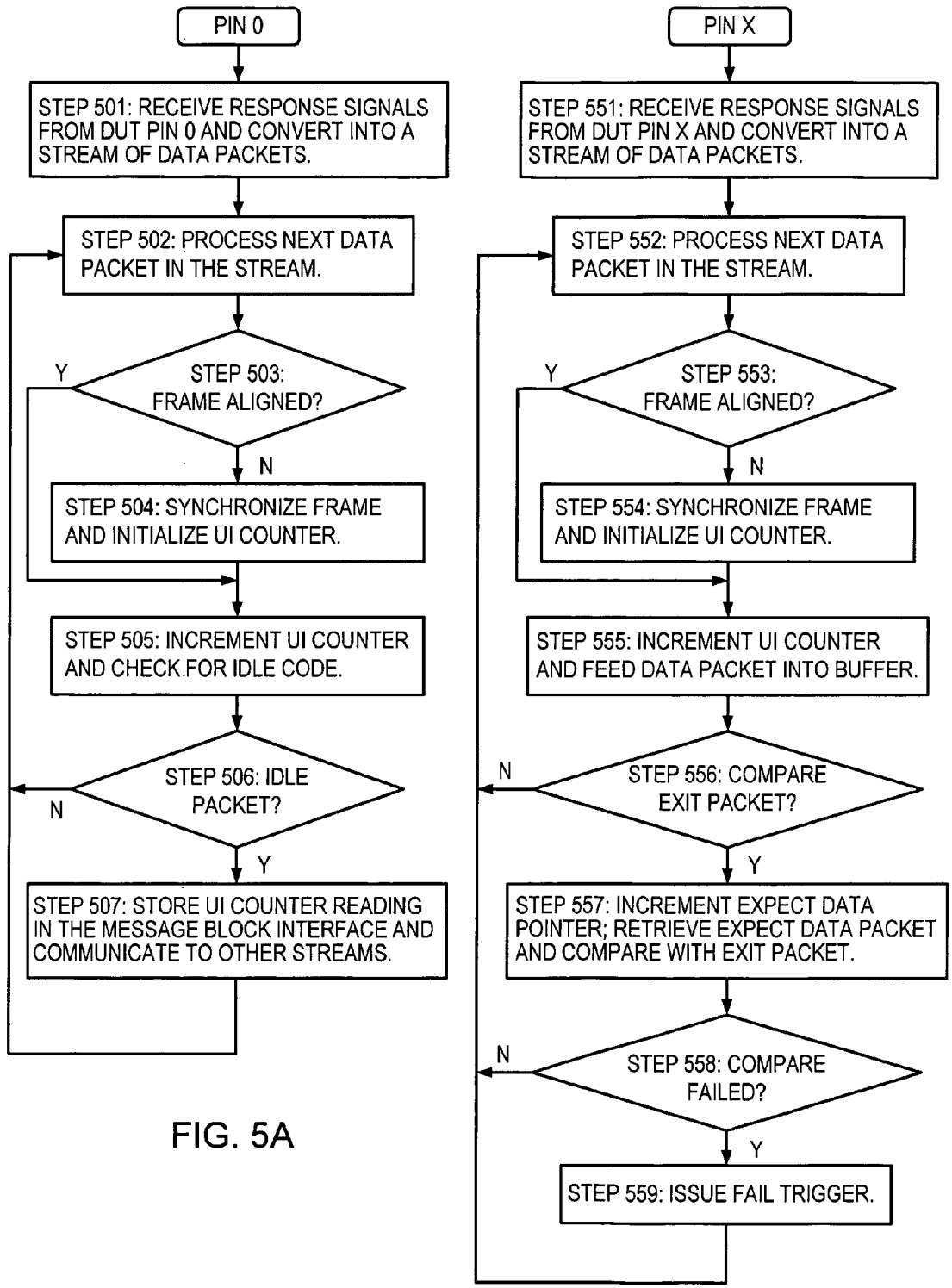
FIGS. 5A and 5B are flow diagrams that illustrate the test methodology according to the invention.

FIGS. 5A and 5B are flow diagrams that illustrate the test methodology according to the invention. FIG. 5A is a flow diagram that illustrate the processing of response signals generated by a pin (e.g., Pin 0) that is designated as the pin at which idle codes appear. FIG. 5B is a flow diagram that illustrate the processing of response signals generated by another pin (e.g., Pin X).

Referring to FIG. 5A, in Step 501, the timing generation circuit 240 corresponding to Pin 0 receives response signals from Pin 0 of the DUT 190 through the pin electronics circuit 250 and digitizes the signals into a stream of data packets. Steps 502–507 represent the processing of the data packets in the stream one at a time. In Step 503, the data packet being processed is checked for frame alignment. If the frame is aligned, the process jumps to Step 505. If the frame is not aligned, frame synchronization is performed using the frame synchronization module 310 (Step 504). Frame synchronization is performed only once for this stream so subsequent data packets in this stream that are processed go directly from Step 503 to Step 505. After frame synchronization, the UI counter 320 is incremented by one and the idle detector 340 examines the data packet for an idle code (Steps 505 and 506). If an idle code is detected, the counter reading at the UI counter 320 is stored in the message block interface 330 and communicated to the other data packet streams (Step 507); the flow then returns to Step 502 and the next data packet in the stream is processed. If an idle code is not detected, the flow returns to Step 502 and the next data packet in the stream is processed.

Referring to FIG. 5B, in Step 551, the timing generation circuit 240 corresponding to Pin X receives response signals from Pin X of the DUT 190 through the pin electronics circuit 250 and digitizes the signals into a stream of data packets. Steps 552–559 represent the processing of the data packets in the stream one at a time. In Step 553, the data packet being processed is checked for frame alignment. If the frame is aligned, the process jumps to Step 555. If the frame is not aligned, frame synchronization is performed using the frame synchronization module 310 (Step 554). Frame synchronization is performed only once for this stream so subsequent data packets in this stream that are processed go directly from Step 553 to Step 555. After frame synchronization, the UI counter 320 is incremented by one and the data packet is fed into the buffer queue 350 (Step 555). When the data packet is fed into the buffer queue 350, a data packet at the end of the buffer queue 350 exits the buffer queue, and a determination is made as to whether or not a comparison of this exit data packet and an expect data packet is to be suppressed or performed (Step 556). If the UI counter reading is equal to any of the idle code UI counter readings+buffer size/16 bits, the comparison is suppressed, and the flow returns to Step 552 where the next data packet is processed. If the UI counter reading is not equal to any of the idle code UI counter readings+buffer size/16 bits, the comparison is performed. Consequently, in Step 557, the expect data pointer 375 is incremented; the expect data packet is retrieved from the DIMM 235; and the exit data packet is compared with the expect data packet. If the comparison fails, a fail trigger is issued and the flow returns to Step 552 where the next data packet is processed (Steps 558 and 559). If the comparison is good, the fail trigger is not issued and the flow returns to Step 552 where the next data packet is processed.

Special idle message codes may be used in situations where the DUT 190 is expected to be in an idle state for more than one time interval or UI counter increment. For example, an idle message code '1001' may be used as an idle code ON/OFF toggle so that all UI counter readings between the ON toggle and the OFF toggle, inclusive, are considered to be UI counter readings corresponding to an idle state of the DUT 190. As a consequence, all data packets corresponding to these UI counter readings will be considered idle data packets and will not be used in the comparisons against expect data packets.

While the foregoing is directed to embodiments of the present invention, other and further embodiments of the invention may be devised without departing from the basic scope thereof, and the scope thereof is determined by the claims that follow.

What is claimed is:

1. An apparatus for testing electronic devices, comprising:
   a drive circuit for generating signals to be supplied to a device under test in accordance with a test program;
   a response circuit for converting signals received from the device under test into a stream of data packets, each corresponding to a first type or a second type;
   a buffer for storing the stream of data packets of the first type and the second type; and
   a programmable device for comparing the data packet of the first type, but not the data packet of the second type, with an expected data pattern.

2. The apparatus according to claim 1, wherein the data packets of the first type comprise data packets converted from signals issued by the device under test during a deterministic state, and the data packets of the second type comprise data packets converted from signals issued by the device under test during a non-deterministic state.

3. The apparatus according to claim 1, further comprising a memory for storing expected data patterns, wherein the programmable device is programmed to retrieve the expected data patterns in accordance with a sequence determined by the test program.

4. The apparatus according to claim 3, wherein the programmable device is programmed to retrieve an expected data pattern that is next in sequence from the memory when the data packet exiting the buffer is of the first type, and to not retrieve any expected data pattern when the data packet exiting the buffer is of the second type.

5. The apparatus according to claim 4, wherein the buffer comprises a FIFO buffer.

6. The apparatus according to claim 1, wherein the programmable device is programmed to detect an idle code in at least one additional stream of data packets, wherein the data packets of the second type correspond in time to those data packets having the idle code.

7. An apparatus for testing electronic devices, comprising:
   a plurality of drive circuits for generating signals to be supplied to a device under test in accordance with a test program;
   a plurality of response circuits for converting signals received from the device under test into multiple streams of data packets; and
   a programmable device for testing each data packet in at least one of the streams for an idle code.

8. The apparatus according to claim 7, wherein the multiple streams of data packets are synchronized with respect to one another.

9. The apparatus according to claim 8, further comprising a plurality of buffers, each buffer storing a different one of the multiple streams of data packets, wherein the programmable device is programmed to test each data packet in said at least one of the streams for the idle code prior to its entry into its corresponding buffer.

10. The apparatus according to claim 9, further comprising a plurality of counters, each counter associated with a different one of the multiple streams and being incremented as the data packets flow into its corresponding buffer.

11. The apparatus according to claim 10, wherein the programmable device is programmed to read the counter associated with said at least one of the streams each time the idle code is detected in a data packet, and to compare each data packet in the other streams with an expected data pattern so long as said data packet does not share the same counter reading as any data packet having the idle code.

12. The apparatus according to claim 7, further comprising another programmable device programmed to selectively compare the data packets in one or more of the other streams with expected data patterns in accordance with a detection of idle codes in said at least one of the streams.

13. The apparatus according to claim 12, wherein the data packets in one or more of the other streams are compared with expected data patterns unless they correspond in time to any data packet in said at least one of the streams that has the idle code.

14. A method of testing electronic devices, comprising the steps of:
   generating signals to be supplied to a device under test in accordance with a test program;
   receiving response signals from the device under test and converting the response signals into first and second streams of data packets;
   testing each data packet in the first stream for an idle code; and
   selectively comparing the data packets in the second stream with expected data patterns specified in the test program.

15. The method according to claim 14, wherein the first and second streams of data packets are synchronized with respect to one another, and a data packet in the second stream is compared with an expected data pattern if it does not share the same time slot as a data packet having the idle code.

16. The method according to claim 15, further comprising the steps of:
   storing the first stream of data packets into a first buffer and the second stream of data packets into a second buffer;
   incrementing a first counter associated with the first buffer each time a data packet enters the first buffer and a second counter associated with the second buffer each time a data packet enters the second buffer; and
   reading the first counter each time the idle code is detected,
   wherein the data packet in the second stream having the same counter reading as any data packet having the idle code is not compared with an expected data pattern.

17. The method according to claim 14, further comprising the step of retrieving expect data patterns from a memory in accordance with a sequence determined by the test program.

18. The method according to claim 14, further comprising the steps of:
   receiving additional response signals from the device under test and converting the additional response signals into additional streams of data packets; and
   selectively comparing the data packets in the additional streams with expected data patterns specified in the test program.

19. The method according to claim 18, wherein a data packet in the additional streams is compared with an expected data pattern if it does not share the same time slot as a data packet having the idle code.

20. The method according to claim 14, wherein the step of selectively comparing is delayed with respect to the step of testing.

* * * * *